Patented May 12, 1953

2,638,472

UNITED STATES PATENT OFFICE 2,638,472

1-BENZYL-5,6,7,8-TETRAHYDROISOQUINO-LINE AND DERIVATIVES THEREOF

Rudolf Grewe, Kiel, Germany, assignor to Hoffmann-La Roche Inc., Nutley, N. J., a corporation of New Jersey No Drawing. Application August 12, 1950, Serial No. 179,085. In Germany August 26, 1949

8 Claims. (Cl. 260—286)

The present invention concerns a process for the manufacture of substituted morphinanes and salts thereof and certain compounds useful as intermediates in such process.

It has been found, according to the present invention, that N-methyl-morphinane, hydroxy- and alkoxy-derivatives thereof and salts thereof may be obtained from 5,6,7,8-tetrahydro-isoquinoline by a process illustrated by the following formulae scheme:

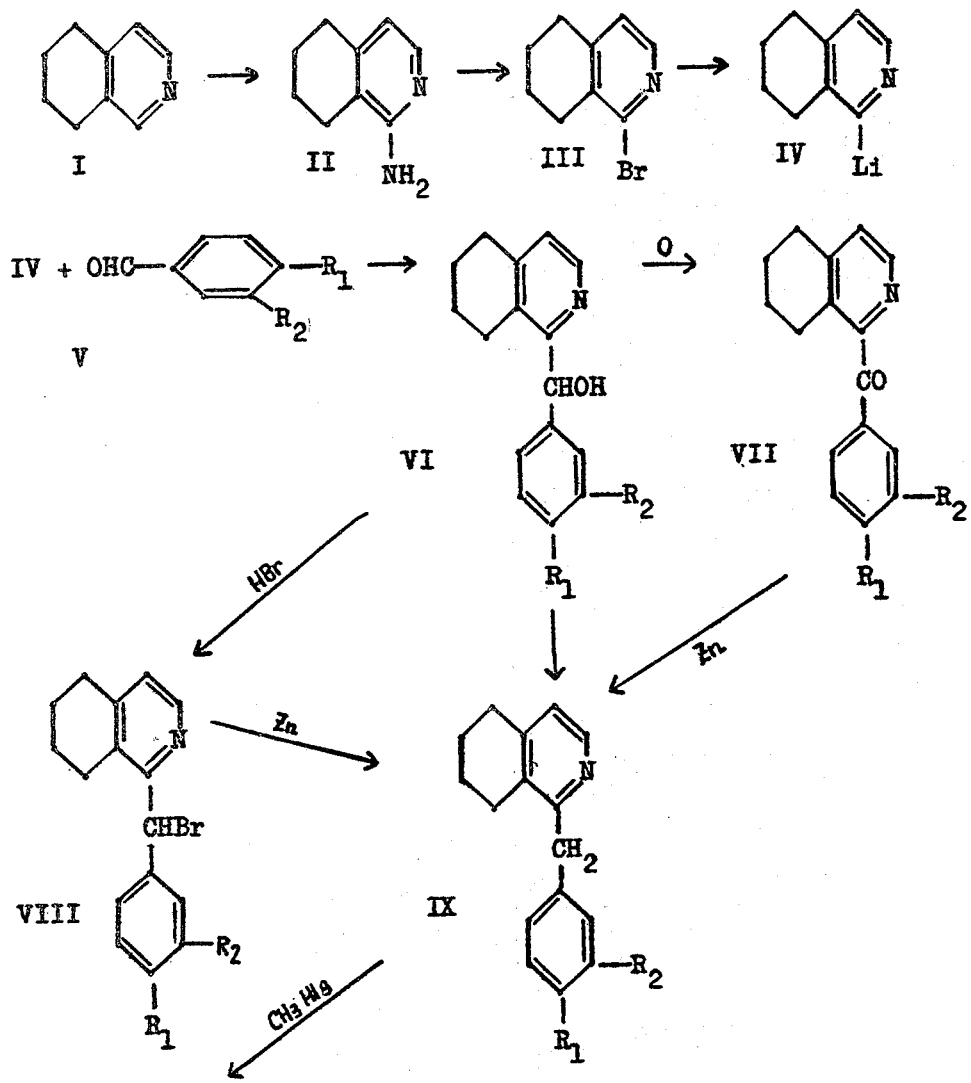

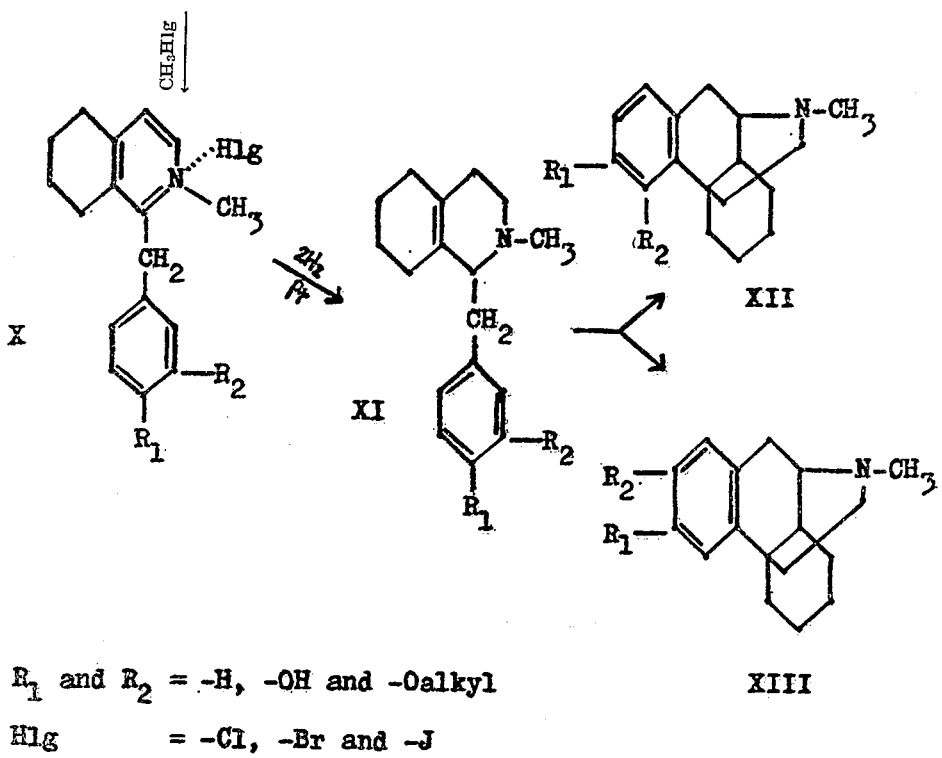

$R_1$ and $R_2$ = -H, -OH and -Oalkyl

Hlg = -Cl, -Br and -J

By reacting 5,6,7,8-tetrahydro-isoquinoline I with sodium amide, 1-amino-5,6,7,8-tetrahydro-isoquinoline II is obtained. In the latter compound the amino group is then replaced by bromine, and the 1-bromo-5,6,7,8-tetrahydro-isoquinoline III thus obtained is a very weak base. The same, suitably in ethereal solution and at low temperature, for example —35° C., is reacted with an ethereal solution of alkyl-lithium (for example, butyl-lithium), whereby the bromine is replaced by lithium. The metal-organic compound IV thus obtained is reacted with an aldehyde of Formula V, whereby a 1-(α-hydroxybenzyl)-5,6,7,8-tetrahydro-isoquinoline of Formula VI is formed. This latter substance may be transformed into the corresponding 1-benzyl-5,6,7,8-tetrahydro-isoquinoline of Formula IX by one of the following methods:

(a) A carbinol VI is brominated, for example with hydrobromic acid, to 1-(α-bromobenzyl)-5,6,7,8-tetrahydro-isoquinoline VIII, and the latter is reduced, for instance with zinc dust, to the benzyl base IX.

(b) A carbinol VI is heated in tetralin with palladium charcoal, whereby it is disproportioned to yield equal parts of 1-benzoyl-5,6,7,8-tetrahydro-isoquinoline of Formula VII and 1-benzyl-5,6,7,8-tetrahydro-isoquinoline IX. This mixture of compounds VII and IX is then reduced with zinc and hydrochloric acid in accordance with the Clemmensen method, whereby the benzyl base IX is uniformly obtained.

(c) A carbinol VI is oxidised, for instance, with potassium permanganate, to the corresponding 1-benzoyl-5,6,7,8-tetrahydro-isoquinoline of Formula VII. The latter is reduced with zinc according to the Clemmensen method to compound IX.

(d) A carbinol of Formula VI is transformed into the corresponding 1-benzyl-5,6,7,8-tetrahydro-isoquinoline IX by reduction with hydriodic acid and red phosphorus.

With methyl halides a 1-benzyl-5,6,7,8-tetrahydro-isoquinoline of Formula IX yields crystallized halogeno methylates of Formula X which, by catalytic hydrogenation, preferably in the presence of alkali and a small quantity of iodine, yield the corresponding 1-benzyl-2-methyl-1,2,3,4,5,6,7,8-octahydro-isoquinoline of Formula XI. The latter is transformed by acid cyclizing agents, such as phosphoric acid, hydrobromic acid or hydrochloric acid, into the corresponding N-methyl-morphinanes of Formula XII and XIII.

The N-methyl-morphinanes and their salts obtained according to the above process are compounds possessing analgesic activity.

EXAMPLE 1

*1-amino-5,6,7,8-tetrahydro-isoquinoline (II)*

150 grams of 5,6,7,8-tetrahydro-isoquinoline (I), 225 grams of dimethyl-aniline and 150 grams of finely powdered sodium amide are placed in a reaction flask equipped with stirrer and condenser, and the mixture is heated in an oil-bath for 10-15 hours to 140-150° C. The reaction product is crushed and decomposed by addition of a lot of ice. The oily mixture of bases is separated, the aqueous layer is twice extracted with ether, the ethereal extracts are united with the main quantity of the bases which is then washed with water. The ether is driven off and the residue is distilled under a pressure of 12 mm. Hg. The first runnings contain some water, at 75-85° C. the main part of the dimethyl-aniline boils over and later on up to 130° C. the remaining parts of the dimethyl aniline together with unchanged starting material. The distillation is continued in the vacuo of an oil-pump with rather high speed while using a wide air-cooled condenser; the boiling point is 120-121° C. under a pressure of 0.45 mm. Hg. The colorless distillate immediately crystallizes in the receiver.

The amine thus obtained is easily soluble in the usual organic solvents; it may be recrystallized from petroleum ether in colorless needles of melting point 81° C.

The base yields a crystallized hydrochloride of melting point 228° C. (from alcohol-ether), a hydrobromide of melting point 182° C. (from alcohol-ether) and a picrate of melting point 269° C. (from acetone).

*1-bromo-5,6,7,8-tetrahydro-isoquinoline (III)*

In a reaction flask equipped with stirrer and thermometer 175 cc. of hydrobromic acid ($d=1.49$) are cooled to —5° C. and 40 grams of the above amine II are added in portions. After the amine is dissolved, the temperature is set to —10° C. and 36 cc. of bromine are added dropwise during 15 minutes while stirring vigorously. While the temperature is still being maintained at —10° C., 50 grams of finely powdered sodium nitrite are added in small portions during 20 minutes. At the beginning of this operation, the temperature stays between —10 and —5° C., but soon rises above 0° C. in spite of the exterior cooling; simultaneously, nitrogen separates rapidly. The reaction is completed after about one hour. The reaction mixture is then set alkaline with a pre-cooled solution of 160 grams of sodium hydroxide in 200 cc. of water, and as soon as the solution has turned light-yellow and the crystalline material dispersed therein appears colorless, the mixture is extracted with ether. The ethereal layer is washed with water, dried and distilled, whereby 52 grams of a yellow oil of boiling point 127° C./0.75 mm. Hg, gradually solidifying in the receiver, are obtained. It may be purified by dissolution in 80 cc. of petroleum ether and causing crystallization by strong cooling; it then shows a melting point of 48° C.

The monobromo compound is a very weak base which may be extracted with ether from an acid solution. It is easily soluble in all organic solvents and insoluble in water.

A picrate as crystallized from alcohol melts at 105° C.

*1 - (α - hydroxy - benzyl) - 5,6,7,8 - tetrahydro - isoquinoline (VI) ($R_1=R_2=H$)*

In a reaction flask equipped with stirrer, dropping funnel, thermometer and a tube for the introduction of gas, 30 grams of pure 1-bromo-5,6,7,8-tetrahydro-isoquinoline III are dissolved in 500 cc. of absolute ether and cooled to a temperature of —35° C. While a weak current of nitrogen is passed through, 120 cc. of 1,2N-ethereal n-butyl-lithium-solution are dropped in so quickly that the inside temperature remains at —30 to —35° C. After termination of the addition, stirring is continued for 15 minutes at —35° C., whereupon a solution of 17.5 grams of benzaldehyde (the calculated quantity would be 15.0 grams) dissolved in 150 cc. of absolute ether are dropped in, whereby the temperature should not be allowed to rise above —25° C. The ethereal solution is then twice washed with water in a separation funnel, and the basic parts of the reaction mixture are extracted with 5 N hydrochloric acid. The extract is set alkaline and the bases are extracted with ether, the extract is washed with water and dried with sodium sulfate. Distillation yields a first run (7.7 grams) containing 5,6,7,8-tetrahydro-isoquinoline and in the main fraction a viscous, light-yellow oil of boiling point 158–161° C./0.05 mm. Hg. The main fraction is dissolved in petroleum ether from which, after rubbing, the carbinol crystallizes in colorless prisms of melting point 63° C.

The carbinol does not form a crystallized picrate. It may be characterized by the hydrochloride of melting point 234° C. (from alcohol-ether) which is hardly soluble in water and rather easily soluble in alcohol and by the sulfate of melting point 213° C. (from alcohol). The iodo methylate melts at 201–203° C. (from acetone).

*1-benzoyl-5,6,7,8-tetrahydroisoquinoline (VII) ($R_1R_2=H$)*

2 grams of the above carbinol are oxidized in dry acetone at room temperature with the calculated quantity of potassium permanganate. After 4–5 hours the manganese dioxide is filtered off, the colorless filtrate is boiled down and alcoholic picric acid is added to the residual oil. After repeated recrystallization from alcohol, the picrate thus obtained melts at 160° C.

The sulfate of the base melts at 166° C. (from alcohol-ether). The base itself could not be obtained in crystallized form; when hydrogenated in the presence of a platinum catalyst in methanol, it easily absorbs 1 mol of hydrogen thereby being transformed quantitatively into the carbinol VI of melting point 62° C.

*1 - benzyl-5,6,7,8-tetrahydro-isoquinoline (IX) ($R_1R_2=H$)*

(a) 10 grams of carbinol VI, 30 cc. of hydriodic acid ($d=1.7$) and a little red phosphorus are refluxed for 3 to 4 hours. The reaction mixture is then filtered and the major part of the acid is distilled off. Water is added, the mixture is set strongly alkaline and then shaken with ether. The base is taken up in 5 N hydrochloric acid, the solution is set alkaline and the base is again extracted with ether, the ethereal solution is washed with water and a little sodium bisulfite solution, dried and then distilled. The base boils over at 150° C./0.25 mm. Hg as a colorless oil which, upon standing for a considerable time, crystallizes in crystals of melting point 31° C. The base is easily soluble in all organic solvents.

The picrate of the base, on crystallization from alcohol, melts at 131.5° C. The sulfate melts at 214° C. (from alcohol-ether). The iodomethylate is a thinly liquid oil which slowly solidifies to highly hygroscopic crystals. The bromo-methylate crystallizes from acetone with 1 mol of crystal water; its melting point is at 92° C. From moist methanol a second form thereof is formed with a melting point of 230° C. containing 5 mols of crystal water.

(b) 5 grams of carbinol VI are heated with 1 gram of palladium charcoal and 10 cc. of tetralin for 8–10 hours to 205–210° C. After cooling down, the reaction mixture is diluted with ether, filtered and shaken with 4 N hydrochloric acid, set alkaline and extracted with ether. After evaporating the ether, 4.65 grams of a yellowish oil are obtained which forms, with alcoholic picric acid, a mixture of the picrate of the benzyl base IX (melting point 131.5° C.) and the picrate of the benzoyl base VII (melting point 160° C.) in the relation 1:1.

The oily mixture of the bases is reduced in accordance with Clemmensen in the usual manner. On allowing the solution combined with hydrochloric acid to stand, the pure zinc double salt crystallizes in massive crystals of melting point 184° C. The benzyl base IX may be set free therefrom by treatment with ammonium solution.

2 - methyl-1-benzyl-1,2,3,4,5,6,7,8-octahydro-isoquinoline (XI) ($R_1R_2=H$)

(a) 0.25 gram of the bromo methylate X of the benzyl base are dissolved in methanol, 1.5 cc. of N-sodium hydroxide and platinum catalyst are added, whereupon the mixture is hydrogenated. 1 mol of hydrogen is taken up in 15 minutes, then the reaction mixture is acidified with 3 cc. N-sulfuric acid, whereupon further 0.85 mol of hydrogen are absorbed within 10 minutes. The reaction product is isolated in the form of a golden-yellow picrate of melting point 133° C.

(b) 1.1 grams of iodo-methylate X of the benzyl base are dissolved in methanol, 7 cc. of N-sodium hydroxide, 1 cc. of iodine solution (0.25 mg. of iodine) and platinum catalyst are added, and the mixture is hydrogenated. During about 20 minutes the first mol and during about further 90 minutes the second mol of hydrogen are absorbed. The reaction product is isolated in the form of its picrate of melting point 133° C.

For the purpose of characterizing the compound, the following derivatives may be prepared: The nitrate of melting point 161.5° C. (from water), the hydrobromide of melting point 194.5–195.5° C. (from alcohol-ether) and the iodo methylate of melting point 178° C.

N-methyl-morpinane (XII) ($R_1R_2=H$)

10 grams of 1-benzyl-1,2,3,4,5,6,7,8-octahydro-isoquinoline are dissolved in 100 grams of sirupy phosphorus acid ($d=1.7$), and the solution is heated for 3 days to 150° C. After cooling down, the reaction mixture is diluted with water, set alkaline by means of ammonia and extracted with ether. For the purpose of purifying the product, the residue obtained by boiling down the ethereal solution in alcoholic solution is transformed into the picrate by means of picric acid. By decomposing the picrate of melting point 177–178° C., the pure N-methyl-morphinane of boiling point 144° C./1 mm. Hg is obtained. The distillate solidifies in the receiver and the crystals thus formed melt at 60–61° C. The hydrobromide has its melting point at 202–203° C.

EXAMPLE 2

1-(a-hydroxy-anisyl)-5,6,7,8-tetrahydro-isoquinoline (VI) ($R_1=OCH_3$, $R_2=H$)

30 grams of the bromo compound III are reacted in the same manner as described above for the reaction with benzaldehyde with 174 cc. of 0.83 N ethereal n-butyl-lithium solution and 21 grams of anisaldehyde V ($R_1=OCH_3$, $R_2=H$) (calculated 19.3 grams). The carbinol base thus obtained can be purified by either of the following methods:

(a) By distillation. A viscous, light-yellow oil boils over at 195–198° C./0.2 mm. Hg. Mostly the pure base crystallizes in prisms of melting point 69° C. from a petroleum ether-ether-mixture. Occasionally, another modification of melting point 89–90° C. is obtained.

(b) The crude carbinol base is dissolved in the calculated quantity of 4 N alcoholic sulfuric acid and the sulfate melting at 199° C. while turning red is isolated.

(c) The carbinol base does not yield a crystalline picrate. The iodo methylate melts at 146° C. (from methanol-ether).

1-anisoyl-5,6,7,8-tetrahydro-isoquinoline (VII) ($R_1=OCH_3$, $R_2=H$)

0.25 gram of the above carbinol base VI is oxidized with potassium permanganate in acetone. The oily reaction product yields a picrate of melting point 186° C. and decomposiiton of the picrate leads to the keto base of melting point 67.5° C.

1-(4'-hydroxy-benzyl)-5,6,7,8-tetrahydro-isoquinoline (IX) ($R_1=OH$, $R_2=H$)

1 gram of the carbinol base VI, 3 cc. of hydriodic acid ($d=1.7$) and a little red phosphorus are refluxed for 3 hours. After cooling down, water as well as an excessive quantity of alkali are added, and the mixture is shaken out with ether. Carbon dioxide is introduced into the aqueous alkaline solution and the phenol base precipitated thereby is taken up in chloroform. After evaporating the chloroform, the residue is crystallized from a benzene solution treated with charcoal. The crystals thus obtained melt at 168° C.

The phenol base may be characterized by the following derivatives: the hydrochloride of melting point 236° C. (from alcohol-ether), the bromo methylate of melting point 208° C. (from methanol-ether) and the iodo methylate of melting point 204° C. (methanol-ether). Upon treatment of 0.5 gram of phenol base IX ($R_1=OH$, $R_2=H$) with diazomethane the methyl ether thereof is quantitatively formed and the latter may be identified by its picrate of melting point 147° C.

1-anisyl-5,6,7,8-tetrahydro-isoquinoline (IX) ($R_1=OCH_3$, $R_2=H$)

(a) 3.5 grams of carbinol base VI are dissolved in 45 cc. of concentrated hydrogen bromide-acetic acid mixture and allowed to stand for 12 hours at room temperature. 12 grams of zinc dust are carried into the solution heated to 25° C. in small portions during 70–80 minutes while stirring. After warming for further 30 minutes to 50° C., the solution is decanted off from the excess zinc, diluted with water, set alkaline with concentrated lye and extracted with ether. The extract is washed and dried, and the ether is evaporated. The oily residue may be purified by way of the picrate of melting point 147° C.

(b) 2.4 grams of the carbinol base VI ($R_1=OCH_3$, $R_2=H$)

are heated for two hours to 225–230° C. with 1 gram of palladium charcoal and 1 cc. of tetralin. After cooling down, ether is added to the reaction mixture, and, after filtering, the basic part thereof is isolated. The Clemmensen reduction of the mixture of bases thus obtained yields 1.6 grams of an oily base which is purified by way of a picrate of melting point 147° C. Simultaneously, 0.5 gram of a second picrate of melting point 154° C. is obtained which contains 2 mols of crystal water and shows a strong depression of melting point when mixed with the picrate of melting point 147° C. After drying in high vacuo at 100° C. (whereby two mols of crystal water are lost), the picrate of high melting point, however, proves to possess the same elementary composition as the picrate of melting point 147° C.

By decomposing the picrate, the base of melting point 39° C. is obtained; it is easily soluble in all organic solvents, and the iodo-methylate X, on crystallization from a methanol-ether mixture, has its melting point at 167.5° C. The chloro-methylate X may be obtained by the action of silver chloride upon the aqueous solution of the iodo-methylate; it does not crystallize.

2 - methyl - 1 - anisyl - 1,2,3,4,5,6,7,8-octahydro-isoquinoline (XI) ($R_1$=$OCH_3$, $R_2$=H)

The iodo- or chloro-methylates X as described above may be hydrogenated in the presence of a platinum catalyst in methanol with or without addition of alkali. For the purpose of characterizing, the hydrogenation products may be transformed into their picrates.

(a) 0.1 gram of iodo-methylate+0.7 cc. of N-sodium hydroxide+0.5 mg. of iodine: 1 mol of hydrogen is taken up in 2 minutes; the second mol within further 13 minutes; melting point of the picrate 174° C.

(b) 1.15 grams of chloro-methylate+8 cc. of N-sodium hydroxide: 1 mol of hydrogen is absorbed during 30 minutes and the second mol during a further 150 minutes. After repeated recrystallizations from alcohol, the picrate melts at 173° C.

(c) 0.6 gram of chloro-methylate without any addition of alkali: 1 mol of hydrogen is absorbed during 4 hours, a second mol during further 8 hours and further 0.5 mol during the next 10 hours. The picrate of the hydrogenation product melts at 173° C.

The picrates of melting points 173° and 174° C. obtained according to the above processes (a) to (c) are identical with one another as evidenced by the melting point of the mixture.

The free octahydro base is an oil yielding a crystallized hydrochloride of melting point 151° C.

3 - hydroxy - N - methyl - morphinane (XII) ($R_1$=OH, $R_2$=H)

0.25 gram of the above oily octahydro base are heated for 6 hours in an oil-bath to 135° C. together with 2.5 cc. of 48 per cent hydrobromic acid. The solution is diluted with water, set alkaline and extracted with ether. The phenol base is separated from the aqueous alkaline solution by the introduction of carbon dioxide, then taken up in ether, washed and dried with sodium sulfate. The ether is evaporated and the residue is recrystallized from dilute alcohol, whereupon the product has a melting point of 252° C.

The compound may be characterized by the hydrobromide of melting point 200° C. (from dilute hydrobromic acid), the methyl-ether of melting point 83° C. (obtainable from the hydrobromide with diazomethane) and the picrate of the methyl-ether of melting point 168° C.

EXAMPLE 3

1 - (α - hydroxy - veratryl) - 5,6,7,8 - tetrahydro-isoquinoline (VI) ($R_1$, $R_2$=$OCH_3$)

60 grams of bromo compound III are reacted with 240 cc. of ethereal n-butyl-lithium-solution (corresponding to 2 grams of lithium) and 50 grams of veratraldehyde in the manner above described. In order to isolate the carbinol base, the dried ethereal solution of the mixture of bases is concentrated to 170 cc. from which solution 50 grams of carbinol crystallize on cooling. Purification is effected by recrystallization from ligroin, the melting point of the crystals being at 90° C. The united ethereal mother liquors are boiled down, and the residue is distilled in vacuo. A viscous, yellow oil passes over at 198–200° C. under 0.03 mm. Hg. From the main fraction, further 9.2 grams of carbinol may be obtained by recrystallization from ether or ligroin.

The carbinol does not form the crystallized picrate. The sulfate thereof melts at 185° C. (from alcohol-ether) and the iodo-methylate at 163° C. (from methanol).

1-veratroyl-5,6,7,8-tetrahydro-isoquinoline (VII) ($R_1R_2$=$OCH_3$)

0.5 gram of the above carbinol is oxidized in dry acetone at room temperature with a calculated quantity of potassium permanganate. The reaction mixture is filtered, the acetone is evaporated from the filtrate, and the residue thereof is recrystallized from alcohol, the crystals thus obtained melting at 131° C.

With alcoholic picric acid, the light-yellow picrate of melting point 105° C. is obtained which, on exposure to light, changes over into a modification of orange color with a melting point of 155° C.

1 - veratryl-5,6,7,8-tetrahydro-isoquinoline (IX) ($R_1R_2$=$OCH_3$)

(a) In a reaction flask equipped with stirrer and thermometer 20 grams of carbinol VI ($R_1$, $R_2$=$OCH_3$) are dissolved in 150 cc. of a mixture of hydrobromic acid and glacial acetic acid, and the solution is left to stand for 24 hours at room temperature. The solution is then heated to 25° C., and in the course of two hours 15 grams of zinc dust are added thereto while stirring and maintaining the temperature between 25–30° C. Towards the end of the reaction, a crystallized zinc double salt precipitates which may be redissolved by the addition of water and heating. The excess zinc dust is filtered off, and concentrated ammonia is added to the filtrate while cooling. After standing, the base, which has separated as an oil, is removed, and the aqueous layer is shaken out with chloroform. The separated oily base and the chloroform extracts are united, washed with water and dried over sodium sulfate. The chloroform is distilled off, and 18 grams of crude base are thus obtained which may be purified by way of the picrate. On crystallization from alcohol, the picrate usually forms massive prisms of orange color with a melting point of 174° C. Frequently, however, an instable modification consisting of light-yellow, clustered needles is obtained. The melting point of the latter will be found at 143° C. if the temperature is raised quickly; if the temperature is raised slowly, the transformation into the stable modification starts at 130° C. The free base boils at 195° C./0.03 mm. Hg, and the crystals obtained from petroleum ether melt at 66° C. The hydrochloride melts at 203° C. (from alcohol-ether).

The iodo-methylate X deliquesce when exposed to air. The bromo-methylate crystallizes from acetone-acetic ester in needles of melting point 55° C. which, by drying in high vacuo, lose 3 mols of crystal water. Occasionally, a modification containing only 1 mol of crystal water, melting at 107° C., is obtained. Both forms of the bromo-methylate may be transformed into one another.

(b) 5 grams of carbinol VI are heated for 1 hour from 200–220° C. with 5 cc. of tetralin and 0.5 gram of palladium charcoal. After cooling down, the reaction product is taken up in ether, filtered, and the basic parts are shaken out with dilute hydrochloric acid. The acid extracts are set alkaline, shaken out with ether, and the ethereal solution is washed, dried and boiled down. The oily residue (4.6 grams) yields with picric acid a mixture of equal parts of veratryl-base-picrate (melting point 173° C.) and veratroyl-base-picrate (melting point 155° C.).

For the preparation of the veratryl base, the oily crude product is reduced in accordance with Clemmensen.

(c) 2.2 grams of carbinol VI are dissolved in 30 cc. of concentrated hydrochloric acid and reduced with 6 grams of rasped zinc while introducing hydrochloric acid gas and stirring on a water-bath. After the zinc has been consumed, the reaction mixture is diluted by the addition of an equal volume of water, set alkaline with strong sodium hydroxide and extracted with ether. The ethereal solution is washed with water, dried and boiled down. 1.7 grams of a colorless, oily residue are obtained, and the latter is dissolved in a small quantity of an ether-petroleum ether mixture; by seeding and cooling, 0.05 gram of the starting material may be obtained from the solution. The mother liquor is concentrated and then yields with alcoholic picric acid 0.8 gram of the picrate of melting point 173° C.

As evidenced by the melting points of the mixtures, the picrates obtained by the different reduction methods are identical with one another.

*1-(3',4'-dihydroxy-benzyl) - 5,6,7,8 - tetrahydro-isoquinoline (IX) ($R_1R_2$=OH)*

0.5 gram of veratryl base is heated for 2 hours in an oil-bath to 130° C. with 5 cc. of 48 per cent hydrogen bromide. On diluting with water, the hydrobromide crystallizes in needles of melting point 145° C.

*2-methyl-1-veratryl-1,2,3,4,5,6,7,8-octahydro-isoquinoline (XI) ($R_1R_2$=OCH$_3$)*

(a) 4 grams of the bromo-methylate X ($R_1R_2$=OCH$_3$) of the veratryl base are dissolved in 100 cc. of methanol, 12.5 cc. (calculated 7.5 cc.) of 2 N sodium hydroxide are added, and the mixture is hydrogenated with 0.2 gram of platinum catalyst. The first mol of hydrogen is taken up very quickly, whereupon the hydrogenation ceases. After acidification with 4 cc. of hydrochloric acid, the hydrogen absorption at first occurs again rather rapidly, but the hydrogenation is terminated as soon as a further half mol of hydrogen has been absorbed. The catalyst is filtered off, the main quantity of the methanol is evaporated, and the base is isolated as usual. With alcoholic picric acid, 2.8 grams of picrate are obtained which, after recrystallization from alcohol, melt at 143.5° C.

(b) 9.35 grams of veratryl base IX ($R_1R_2$=OCH$_3$) are dissolved in 10 cc. of methanol and are heated in a tube for 3 hours to 100° C. with 2.5 cc. (calculated 2.05 cc.) of methyl iodide. Then, the excess methyl iodide is removed on a water-bath from the light-brown solution and 150 cc. of methanol, a solution of 50 mg. of iodine in 50 cc. of methanol and 50 cc. of 2 N sodium hydroxide are added, whereupon the mixture is shaken with 1 gram of platinum catalyst while introducing hydrogen. The first mol of hydrogen is taken up within 10 minutes, then the absorption becomes slower and it is terminated after 3 hours during which time little more than 2 mols of hydrogen have been taken up. The reaction mixture is filtered, acidified with 2 N hydrochloric acid until it is of weakly acid reaction, and the methanol is distilled off in vacuo. The residue is set alkaline, extracted with ether, the ethereal solution is washed, dried and distilled, whereby the main portion boils over at 166° C./0.2 mm. Hg. With alcoholic picric acid a picrate of melting point 143.5–145° C. (clearly molten at 147° C.) precipitates. The melting point of a mixture of this product with the picrate obtained in accordance with (a) above does not show any depression.

*4-hydroxy- 3 -methoxy - N - methyl-morphinane (d,l-tetrahydro-desoxycodeine)*

(a) 2.9 grams of 2 - methyl - 1 - veratryl-1,2,3,4,5,6,7,8 - octahydro - isoquinoline are dissolved in 40 cc. of concentrated hydrochloric acid and are heated for 10 hours to 120° C. (temperature of the oil-bath) while introducing hydrogen chloride gas. The reaction is then diluted with water, set alkaline with concentrated ammonia and shaken out with ether. The ethereal solution is washed with water and the phenolic parts are removed with dilute sodium hydroxide. The ethereal solution is again washed with water, dried and boiled down. The residue is a light-yellow oil (0.2 gram) which, after distillation in vacuo (120° C./0.01 mm. Hg), crystallizes on rubbing with moist acetone.

(b) 5.3 grams of 2-methyl-1-veratryl-1,2,3,4,-5,6,7,8-octahydro-isoquinoline are dissolved in 50 cc. of 48 per cent hydrobromic acid and then heated for 7 hours to 130° C. in an oil-bath while passing through pure nitrogen. Water is then added, whereupon 2,3-dihydroxy-N-methyl-morphinane hydrobromide of melting point 248° C. partially precipitates. It redissolves to form a clear solution on addition of more water, and from such solution the mixture of the phenol bases is precipitated by means of soda solution. The amorphous precipitate is filtered off, dried, dissolved in little methanol and excess ethereal diazomethane solution is added. After standing for some time, the remaining phenolic parts are removed by shaking out with alkali. The ether is then evaporated, the residual oil is distilled in vacuo (boiling point 125° C./0.05 mm. Hg), dissolved in alcohol and picric acid is added. 1.9 grams of picrate of melting point 211° C. precipitate which, by mixture test, may be identified as 2,3-dimethoxy-N-methyl-morphinane-picrate. The excess picric acid is removed from the mother liquor and, after evaporating the solvent, an oil is obtained which is distilled in vacuo (boiling point 120° C./0.01 mm. Hg) and caused to crystallize (0.15 gram) by rubbing with moist acetone.

The compound obtained by either of the two methods may be purified by recrystallization from gasoline, alcohol or acetone. From acetone typical hexagonal heavy plates are obtained, sintering at about 123° C., melting at 127–130° C. and splitting off gas-bubbles at 135° C. The mixture test with d,l-tetrahydro-desoxycodeine does not show any depression.

With an equivalent portion of d-tartaric acid, the racemate yields, from dioxane and on seeding with d-tetrahydrodesoxycodeine-tartrate, crystals melting at 110° C. while foaming up. The salt contains 1 mol of dioxane; it is very easily soluble in water and alcohol. By decomposition of the tartrate pure d-tetrahydro-desoxycodeine is obtained.

I claim:
1. A compound selected from the group consisting of those having the general formula

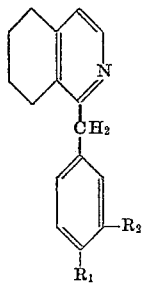

wherein $R_1$ and $R_2$ are selected from the group consisting of hydrogen, hydroxy and alkoxy radicals and salts thereof.

2. A compound according to claim 1, which is a quaternary salt.

3. As a new compound 1-p-methoxybenzyl-5,6,7,8-tetrahydro-isoquinoline-halogenomethylate of the formula

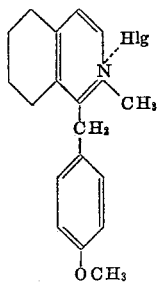

wherein Hlg is selected from the group consisting of chlorine, bromine and iodine.

4. As a new compound 1-(4'-hydroxy-benzyl)-5,6,7,8-tetrahydro-isoquinoline of the formula

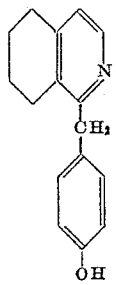

5. As a new compound 1-p-methoxybenzyl-5,6,7,8-tetrahydroisoquinoline of the formula

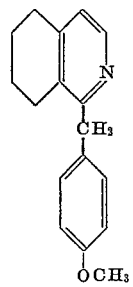

6. A quaternary salt of 1-(4'-hydroxy-benzyl)-5,6,7,8-tetrahydroisoquinoline with an alkyl halide.

7. A quaternary salt of 1-p-methoxybenzyl-5,6,7,8-tetrahydroisoquinoline with an alkyl halide.

8. 1-veratryl-5,6,7,8-tetrahydroisoquinoline of the formula

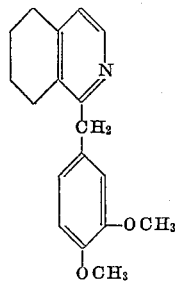

RUDOLF GREWE.

References Cited in the file of this patent

UNITED STATES PATENTS

| Number | Name | Date |
| --- | --- | --- |
| 2,223,373 | Kulz et al. | Dec. 3, 1940 |
| 2,524,855 | Schnider et al. | Oct. 10, 1950 |

FOREIGN PATENTS

| Number | Country | Date |
| --- | --- | --- |
| 253,710 | Switzerland | Dec. 1, 1948 |

OTHER REFERENCES

Grewe: Die Naturwissenschaften, vol. 33, pp. 333–336 (1946).

Grewe et al.: Chem. Ber., vol. 81, pp. 279–286 (1948).